United States Patent
Privault et al.

(10) Patent No.: US 9,405,456 B2
(45) Date of Patent: Aug. 2, 2016

(54) MANIPULATION OF DISPLAYED OBJECTS BY VIRTUAL MAGNETISM

(75) Inventors: Caroline Privault, Montbonnot-Saint-Martin (FR); Jacki O'Neill, Grenoble (FR); Jean-Michel Renders, Quaix-en-Chartreuse (FR); Victor Ciriza, La Tour du Pin (FR); Yves Hoppenot, Notre Dame de Mesage (FR); Gregory Bauduin, Echirolles (FR); Ana Fucs, Meylan (FR); Ye Deng, Meylan (FR); Grégoire Gerard, Villeurbanne (FR); Mathieu Knibiehly, Lyons (FR)

(73) Assignee: XEROX CORPORATION, Norwalk, CT (US)

( * ) Notice: Subject to any disclaimer, the term of this patent is extended or adjusted under 35 U.S.C. 154(b) by 1886 days.

(21) Appl. No.: 12/480,002

(22) Filed: Jun. 8, 2009

(65) Prior Publication Data

US 2010/0313124 A1    Dec. 9, 2010

(51) Int. Cl.
   *G06F 3/00*       (2006.01)
   *G06F 3/0488*     (2013.01)
   *G06F 3/0481*     (2013.01)

(52) U.S. Cl.
   CPC .......... *G06F 3/0488* (2013.01); *G06F 3/04812* (2013.01)

(58) Field of Classification Search
   CPC ........................................... G06F 3/00
   USPC ........................... 715/702, 733, 764
   See application file for complete search history.

(56) References Cited

U.S. PATENT DOCUMENTS

| | | | | |
|---|---|---|---|---|
| 5,920,313 | A * | 7/1999 | Diedrichsen et al. | 715/767 |
| 6,714,222 | B1 * | 3/2004 | Bjorn et al. | 715/839 |
| 7,191,177 | B2 * | 3/2007 | Konaka | 707/758 |
| 2007/0005356 | A1 | 1/2007 | Perronnin | |
| 2007/0143101 | A1 | 6/2007 | Goutte | |
| 2007/0239745 | A1 | 10/2007 | Guerraz et al. | |
| 2007/0258648 | A1 | 11/2007 | Perronnin | |
| 2008/0069456 | A1 | 3/2008 | Perronnin | |
| 2008/0165136 | A1 | 7/2008 | Christie et al. | |
| 2008/1024999 | | 10/2008 | Renders et al. | |
| 2008/0307359 | A1 * | 12/2008 | Louch et al. | 715/835 |

(Continued)

OTHER PUBLICATIONS

BackStop LLP Software, http://backstopllp.com/software.html, downloaded May 21, 2009.

(Continued)

*Primary Examiner* — Amy Ng
*Assistant Examiner* — Meseker Takele
(74) *Attorney, Agent, or Firm* — Fay Sharpe LLP

(57) ABSTRACT

A computer implemented tactile user interface (TUI) and a method of manipulating objects with a virtual magnet are provided. The TUI includes a display comprising a touch-screen. The display is configured for displaying a set of graphic objects, each graphic object representing a respective one of a set of items, such as documents, e.g., text documents or images. A virtual magnet is caused to move on the display, in response to touching on the touch-screen, e.g., by dragging a finger or other implement across. The magnet is associated with a particular function command such that a subset of the graphic objects exhibits a response to the virtual magnet (e.g., is caused to move, relative to the virtual magnet or exhibits another visible response), each graphic object in the subset moving or otherwise responding as a function of an attribute of the underlying item represented by the graphic object.

24 Claims, 18 Drawing Sheets

(56) References Cited

U.S. PATENT DOCUMENTS

| | | |
|---|---|---|
| 2009/0077488 A1 | 3/2009 | Ording |
| 2009/0100343 A1* | 4/2009 | Lee et al. .................... 715/733 |
| 2009/0307623 A1* | 12/2009 | Agarawala et al. .......... 715/765 |
| 2010/0169828 A1* | 7/2010 | Kho et al. .................... 715/810 |

OTHER PUBLICATIONS

Benarent, *How to Create a (Magnetic) Tangible User Interface*, available at http://www.benarent.co.uk/bog/design/how-to-create-a-magnetic-tangible-user-interface http://jive.benarent.co.uk/, May 26, 2008.

Bier, et al., *Toolglass and Magic Lenses: The See-Through Interface*, available at: http://www2.parc.com/istl/projects/MagicLenses/93Siggraph.html, downloaded May 12, 2009.

BumpTop, http://bumptop.com/, downloaded May 12, 2009 and May 21, 2009.

Ishii, Making the Virtual Tangible, *MIT Tech Talk*, vol. 53, No. 21, Apr. 8, 2009, available at http://web.mit.edu/newsoffice/2009/techtalk53-21.pdf.

Love, N., Automating Document Review, *CS224n Final Project*, Jun. 9, 2006.

Microsoft Surface™ (http://www.microsoft.com/surface/) downloaded May 21, 2009.

Multi-Touch $G^2$—Touch Screen from PQ Labs, CA (http://multi-touch-screen.net/ downloaded 5/21/9).

O'Neill, et al., DISCO: Intelligent Help for Document Review, *DESI III Global E-Discovery/E-Disclosure Workshop: A Pre-Conference Workshop at the 12$^{th}$ Intl. Conf. on Artificial Intelligence and Law*, Jun. 8, 2009. (At http://www.law.pitt.edu/DESI3_Workshop/DESI_III_papers.html, Jun. 4, 2009.).

Ryall, et al., Experiences with and Observations of Direct-Touch Tabletops, *Proc. of 1$^{st}$ IEEE Intl. Workshop on Horizontal Interactive Human-Computer Systems*, 2006, pp. 89-96.

U.S. Appl. No. 12/245,939, filed Oct. 6, 2008, Perronnin.
U.S. Appl. No. 12/251,689, filed Oct. 15, 2008, Perronnin.
U.S. Appl. No. 12/252,531, filed Oct. 16, 2008, Perronnin.

* cited by examiner

MANIPULATION OF DISPLAYED OBJECTS BY VIRTUAL MAGNETISM

BACKGROUND

The exemplary embodiment relates to an apparatus and method for manipulations of graphic objects. It relates particularly to a multi-touch screen which displays a virtual magnet that allows displayed graphic objects to be manipulated as a function of attributes of underlying items that the objects represent, through finger or implement-guided movement of the magnet.

Multi-touch interactive systems using specific user-interface designs and capabilities allow users to navigate easily through interactive content on multi-touch screens, interactive tables, or interactive windows, all of which are referred to herein as tactile user interfaces (TUIs). TUIs incorporate a display and touch-screen which detects user hand or implement movements. The detected movements are translated into commands to be performed, in a similar manner to conventional user interfaces which employ keyboards, cursor control devices, and the like.

However, translating the design of standard graphical user interfaces to multi-touch interactive devices is not always straightforward. This can lead to complex manipulations that the user may need to memorize in order to use the functionality provided by a touch-screen application. Additionally, hand movements often lack the precision which can be achieved with a keyboard and fingers differ in size and shape, causing different touch signals to be sent from the touch-screen to the application.

For example, in the case of a large set of documents to be reviewed and classified, the repeated user actions of dragging each object, reviewing it, and then moving it to a selected file or other action may become wearing on the reviewer after an hour or two of such actions.

There is a need for transparent and intuitive user interfaces that increases the effectiveness, the efficiency and the user satisfaction with multi-touch interactive devices.

INCORPORATION BY REFERENCE

The following references, the disclosures of which are incorporated herein in their entireties by reference, are mentioned.

U.S. Pub. No. 2009/0077488, published Mar. 19, 2009, entitled DEVICE, METHOD, AND GRAPHICAL USER INTERFACE FOR ELECTRONIC DOCUMENT TRANSLATION ON A TOUCH-SCREEN DISPLAY, by Bas Ording, discloses a device incorporating a touch screen display and method for detecting a movement of an object on or near the touch screen display and translating an electronic document displayed on the touch screen display in response to the detected movement. An area beyond an edge of the electronic document is displayed in response to the edge of the electronic document being reached. In response to detecting that the object is no longer on or near the touch screen display, the document is translated in a second direction until the area beyond the edge of the document is no longer displayed.

U.S. Pub. No. 2008/0165136, published Jul. 10, 2008, entitled SYSTEM AND METHOD FOR MANAGING LISTS, by Greg Christie, et al., discloses a computer-implemented method for displaying and managing lists on a portable multifunction device with a touch screen display includes displaying a list of items, detecting a finger contact on a moving-affordance icon, detecting movement of the finger contact on the touch screen display, and in response to detecting the movement of the finger contact, moving the moving-affordance icon and the corresponding item in the list in accordance with the movement of the finger contact.

U.S. Pat. No. 6,714,222, issued Mar. 30, 2004, entitled GRAPHICAL USER INTERFACE FOR COMMUNICATIONS, by Staffan Bjorn, et al., discloses a graphical user interface which provides access to communications and other applications in a home environment by utilizing icons that appear like refrigerator magnets. The virtual magnets are displayed on a background of the screen and may be dragged to new locations by a user. Tapping on a virtual magnet activates a corresponding application.

BRIEF DESCRIPTION

In accordance with one aspect of the exemplary embodiment, a tactile user interface includes a display comprising a touch-screen and instructions stored in memory for a) displaying a set of graphic objects on the display, each graphic object representing a respective item, b) causing a virtual magnet to move on the display, in response to touching on the touch-screen, and c) causing a subset of the graphic objects to exhibit a response to the virtual magnet, each graphic object in the subset responding as a function of an attribute of the item represented by the graphic object. A processor, in communication with the memory and display, executes the instructions.

In accordance with another aspect of the exemplary embodiment, a manipulation method includes displaying a set of graphic objects on a display of a touch-screen device, each graphic object representing an item, providing a virtual magnet which is movable on the display, in response to touching on the touch-screen. When the magnet is moved to a location closer to the set of displayed graphic objects, the method includes causing a subset of the graphic objects to exhibit a response to the magnet as a function of an attribute of each of the items represented by the graphic objects in the subset.

In accordance with another aspect of the exemplary embodiment, a tactile user interface includes a display with a touch-screen and memory which stores a set of items comprising at least one of documents and images. Instructions are stored in memory for displaying a set of graphic objects on the display, each graphic object representing a respective one of the stored items, displaying a virtual magnet on the display which is visually distinguishable from the graphic objects, associating the virtual magnet with a function which draws graphic objects towards the virtual magnet on the screen based on an attribute of the respective stored item, and after the virtual magnet is actuated by touching of the touch-screen, causing a subset of the graphic objects to move toward the magnet, whereby the subset is separated from a remainder of the set of graphic objects, and displaying an item (such as a document) corresponding to a user-selected one of the displayed graphic objects. A computer processor is in communication with the memory for executing the instructions.

DETAILED DESCRIPTION

Figure 1:
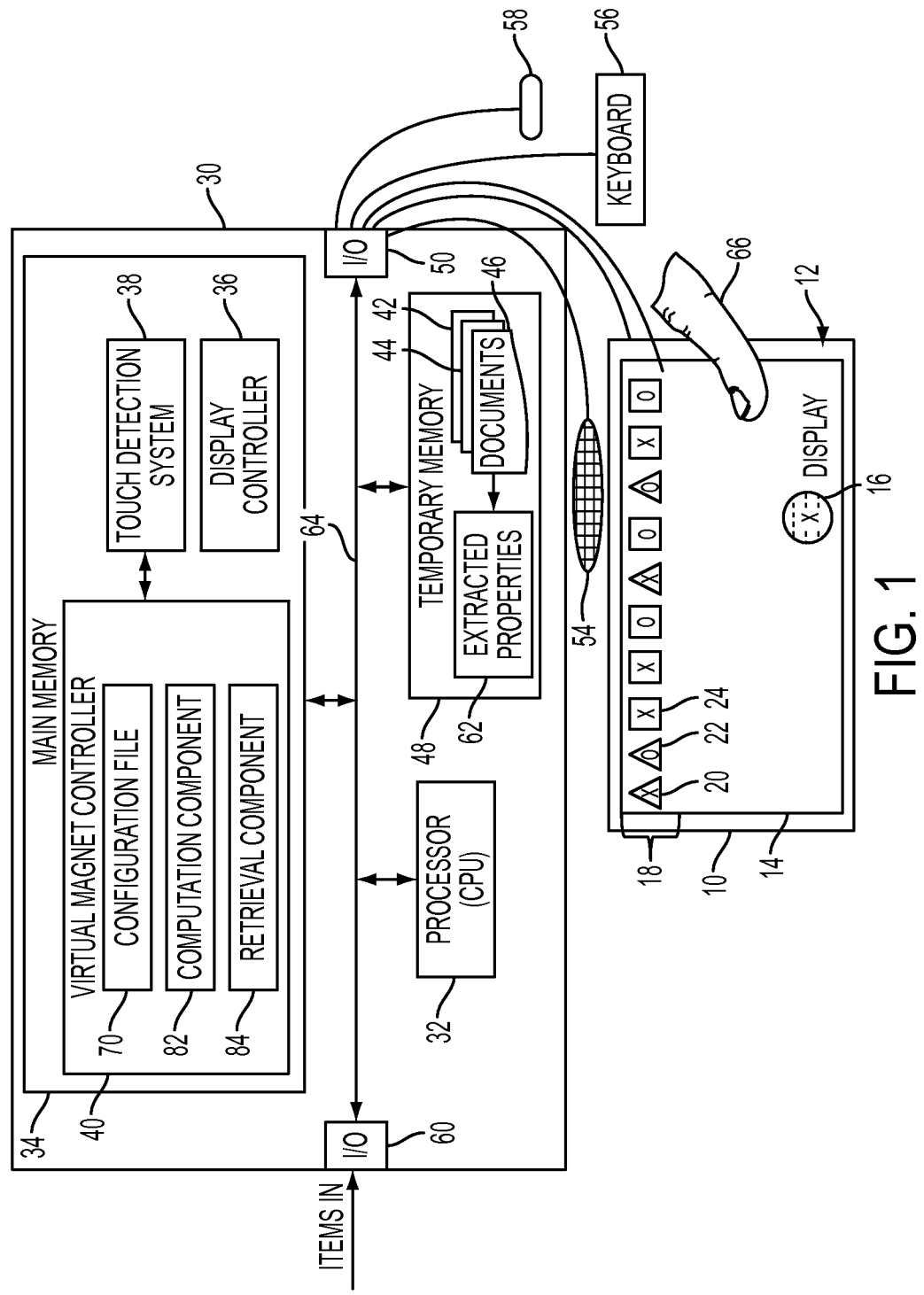
FIG. 1 is a functional block diagram of an exemplary apparatus incorporating a tactile user interface in accordance with one aspect of the exemplary embodiment.

Aspects of the exemplary embodiment relate to a multi-touch tactile user interface ("TUI") for manipulating graphic objects of items, such as documents, and to a method of using the interface.

As used herein, a "virtual magnet" may be an icon, such as a button, which is displayed on a screen and is visible to a user. The virtual magnet is responsive to the user's touch allowing the magnet to be repositioned within the screen area. Alternatively, the virtual magnet may be an invisible region which changes position in response to movement of an implement (any tangible object such as a hand or inanimate object) which is positioned on or near the screen. The virtual magnet has functionality similar to that of a real magnet in that it is capable eliciting a response in the objects in its vicinity. Here, the objects are graphic objects, displayed on the screen. In one exemplary embodiment, the virtual magnet is capable of drawing objects towards it (or in some cases, repelling them). The objects are able to move across the screen from their original positions to a new position closer to (or further away from) the virtual magnet. In other embodiments, the response exhibited by the objects to the virtual magnet may include a change in a visible property of the graphic objects, such as a change in one or more of color, size, shape, highlighting, or combination thereof, which is readily discernible to a person viewing the TUI.

The virtual magnet elicits a response by ones of the displayed objects which is a function of one or more attributes of the underlying items represented by the displayed objects. The objects each represent one of a set of items. In the exemplary embodiment, the items are electronic documents, such as text documents and/or digital images, although it is to be appreciated that other types of item are also contemplated, as described in greater detail below.

In one embodiment, the displayed graphic objects represent a set of electronic text documents stored in memory. The attributes, in this case, can be based on the frequencies of keywords found in the documents, cluster based attributes, generated by automatically assigning the documents to one of a predetermined clusters based on similarity, or any other attribute which can be extracted, from the document, such as date sent, author, metadata, such as document size, document type, image content, and the like. Clustering of documents based on similarity is described for example, in U.S. Pub. Nos. 2007/0143101, 2007/0239745, 2008/0249999, and U.S. application Ser. No. 12/245,939, filed Oct. 6, 2008, the disclosures of which are incorporated herein in their entireties by reference.

In another embodiment, the displayed graphic objects may represent a set of stored digital images, in which case the displayed objects may be icons or thumbnails of the images. The attributes, in this case, may be low level features of the images, such as color or texture, higher level representations of the images based on the low level features (see, for example, U.S. Pub. Nos. 2007/0005356, 2007/0258648, 2008/0069456, and application Ser. No. 12/252,531, filed on Oct. 16, 2008, and Ser. No. 12/251,689, filed on Oct. 15, 2008, the disclosures of which are incorporated herein in their entireties by reference), cluster-based attributes, as described above for documents, or classes automatically (e.g., based on the high level features) or manually assigned to the images, such as "cat," "dog," "landscape," etc.

The items, however, are not restricted to documents. Indeed the displayed objects may represent any items, tangible or digital, for which attributes of the item can be extracted and used to define a response of the displayed graphic object to the magnetic force as a function of the attribute(s) of the item. For example, the items may include a set of consumer products stored in a warehouse or items offered for sale by an on-line retailer, and the corresponding graphic objects move as a function of attributes of the items, such as the number in stock, type of object, customer ratings, price, etc.

The displayed graphic objects differ in their response to the magnet, allowing one or more displayed objects to be separated from other objects. The set of items corresponding to the separated displayed objects (e.g., retrieved documents) can be further processed by the user (e.g., read, viewed, classified, saved, etc). In one exemplary embodiment, the objects translate towards the magnet as a function of the attribute (or attributes) of the underlying item and otherwise remain stationary if a predetermined threshold of the function is not met. In other embodiments, a repulsive force could also be simulated, causing some objects to move away from the virtual magnet as a function of their attributes. In yet further embodiments, the objects arrange themselves at varying distances from the virtual magnet as a function of the item's attributes.

The exemplary TUI thus provides a user with means for classifying, filtering, and/or retrieving documents and other items quickly and easily.

FIG. 1 illustrates an apparatus which includes an exemplary tactile user interface (TUI) 10. The TUI includes a display 12, such as an LCD or plasma screen, computer monitor, or the like, which may be capable of displaying in color. A touch-screen 14 including multiple actuable areas which are independently responsive to touch or close proximity of an object (touch-sensitive) overlies or is integral with the screen of the display 12. The actuable areas may be pressure sensitive, heat sensitive, and/or motion sensitive. The actuable areas may form an array across the touch-screen 14 such that touch contact within different areas of the screen may be associated with different operations. The touch-screen also displays in the middle or at any other predefined place, a specific button, identified as the virtual magnet 16, that the user activates through a touch action, which can be one or more finger contacts with the touch-screen display, or something with a relatively large touch area touching on the screen, e.g., an implement or the whole palm of the hand.

Exemplary touch-sensitive screen devices 10 which allow finger-touch interaction, which may be used herein, include the Multi-Touch G²-Touch Screen from PQ Labs, California (see http://multi-touch-screen.net) and Microsoft Surface™ touch-screen table (http://www.microsoft.com/surface/). On this type of large touch-screen, which may have a height and/or width greater than the maximum dimension of an item (e.g., a screen measuring about 80 cm or greater on the diagonal), a large number of virtual objects can be displayed and manipulated by one or more users through natural gestures. However, it is also contemplated that the display device may have a smaller screen, e.g., the size of a mobile phone screen, which may display fewer than all the graphic objects at one time, and provide for viewing a selected portion of one of the documents on the screen.

The TUI 10 shown in FIG. 1 is configured for displaying, in addition to the virtual magnet 16, a set 18 of graphic objects 20, 22, 24, etc., to be manipulated by the virtual magnet. Each graphic object represents one of a collection of items, such as documents. The virtual magnet 16 has an inactive state in which it is stationary, but it is actuable and translatable, across the display 12 in multiple directions, e.g., in straight lines, curves, other motions, or the like in response to a finger touch or contact with the screen of another suitably sized implement, such as a cylinder.

The display device 12 is operatively connected with a computer device 30, such as one or more general purpose computing devices or dedicated computing device(s), such as a desktop computer, laptop computer, server computer personal digital assistant, cell phone, or other device with computing capability. In one embodiment, the computer 30 is embedded in the touch-screen device 10, behind the screen 12. The computer 30 includes a processor 32 in communication with a main memory 34, which stores computer program instructions for implementing the display and touch-screen functionality as well as the virtual magnet 16 functionality. In particular, the computer memory 34 stores a display controller 36, which controls the contents of the display, and a touch detection system 38 which detects the locations of finger contacts with the touch-screen 14 and movements of the finger across the screen and outputs signals in response thereto. Both of these components 36, 38 may form a part of the software supplied with the touch-screen device 10. In addition, a virtual magnet control application 40 ("virtual magnet controller") receives signals from the touch detection system 38 and supplies control signals to the display controller 36 for controlling the movement of the virtual magnet 16 in response to the touch signals and controlling movements of the virtual objects 20, 22, 24, based on attributes of a collection of corresponding electronic documents 42, 44, 46 etc., or other items stored in computer memory, such as temporary memory 48. In one embodiment, the magnet controller 40 serves as a plug-in software component to the display controller 36/touch detection system 38. In other embodiments, the magnet controller 40 may be at least partly resident on a server in communication with the computer 30, and may be accessed via a wired or wireless link, such as a telephone line, or a LAN or WLAN, such as the Internet.

The magnet controller 40 may be embodied in hardware, software, or a combination thereof. In the illustrated embodiment, the magnet controller 40 comprises processing instructions, stored in memory 34, which are executed by the associated processor 32. In particular, the processor 32 executes computer program instructions stored in memory 34 for implementing the manipulation method described below with reference to FIG. 2.

An input/output interface 50 allows the computer 30 to communicate with the display 12 and receive touch signals from the touch-screen 14. The computer may also communicate with speakers 54, and a keyboard 56 for inputting text, and/or a cursor control device 58, such as mouse, trackball, or the like, for communicating user input information and command selections to the processor 32. However, in the exemplary embodiment, all user inputs are via the touch-screen. Another input/output interface 60, such as a modem, intranet or internet connection, USB port, disk slot, or the like, allows documents 42, 44, 46, other items, and/or pre-computed attributes 62 thereof to be input to temporary memory 48, from an external source. As previously noted, exemplary attributes which may be extracted from documents include presence or absence of specified keywords, document size, a class assigned to the document, e.g., stored in meta data, a function describing the similarity of the document to a predefined document or set of documents, or the like.

The components 32, 34, 48, 50, 60 of the computing device 30 may communicate via a data/control bus 64.

Using touch of a finger 66 (FIG. 1) or touch of an implement, displayed objects 20, 22, 24, etc., are attracted to the virtual magnet 16 in relation to the underlying document's 42, 44, 46 compliance with one or more predefined functions. For example, objects are attracted by the virtual magnet button 16 and move from their original place on the touch-screen display 12 to get closer to the magnet 16, or exhibit another visible response to the magnet.

The processor 32 may be the computer 30's CPU or one or more processing devices, such as a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used as the processor.

Computer-readable memories 34, 48, which may be combined or separate, may represent any type of computer readable medium such as random access memory (RAM), read only memory (ROM), magnetic disk or tape, optical disk, flash memory, or holographic memory. In one embodiment, the computer memory 34, 48 comprises a combination of random access memory and read only memory. In some embodiments, the processor 32 and memory 34 may be combined in a single chip.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
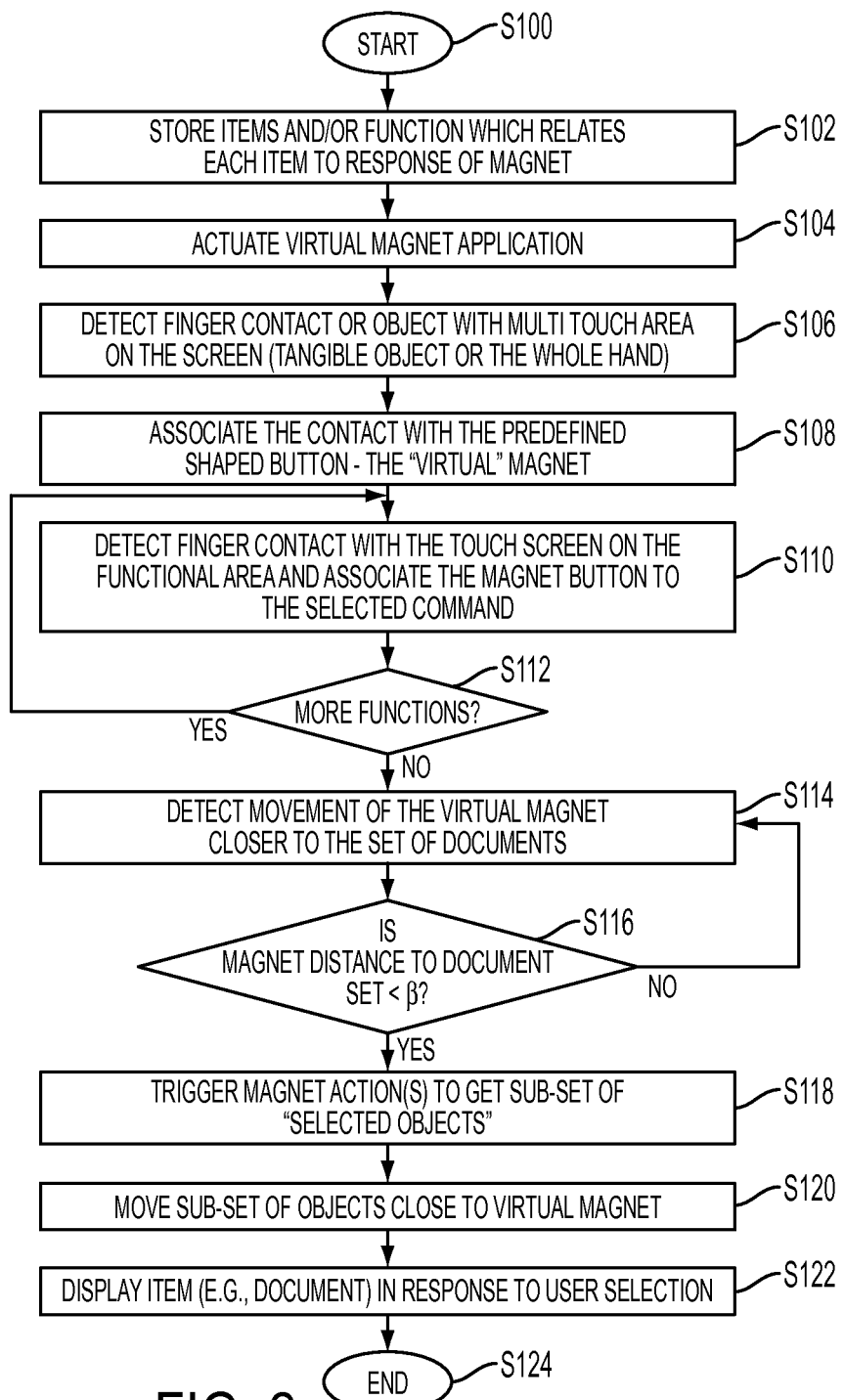
FIG. 2 illustrates steps of an exemplary item manipulation method, in accordance with another aspect of the exemplary embodiment.

FIG. 2 illustrates an exemplary manipulation method which may be performed with the virtual magnet 16 of FIG. 1. The method begins at S100.

At S102, items, such as documents 42, 44, 46, are received and stored in memory 48. For each item, a corresponding graphic object in a set of graphic objects is to be displayed. A response function, which defines how each of the set of displayed objects 20, 22, 24 will respond to the virtual magnet 16 based on one or more of the item's attributes, is generated and/or stored, e.g., in memory 34, for example in a library (not shown) or elsewhere, such as in the configuration file 70 or computation component 82. A plurality of different response functions may be stored and each associated with a respective one of a plurality of function selecting icons 72, 74, 76, 78 to be displayed (see the screenshot illustrated in FIG. 3).

At S104, the virtual magnet control application 40 is launched. If the current screen on the display already displays the magnet 16, actuation may be initiated by the user tapping on or otherwise touching the virtual magnet 16. Otherwise, a user may touch an icon (not shown) on the screen which causes the processor to implement the magnet's configuration file 70. Alternatively, the magnet application can be selected from a drop down menu or by other means. The objects 20, 22, 24, etc. (one for each item 42, 44, 46) are displayed on the screen 12 as well as the virtual magnet 16 when the application 40 is launched. In one embodiment, the displaying of the objects proceeds automatically. In another embodiment, a user may chose a file using a menu, and only graphic objects corresponding to items in the selected file are displayed. The displayed objects 20, 22, 24 may all have the same appearance or may be shown differently to represent some attribute of the item. For example, objects may have different colors, shapes, sizes, and/or textual content, to graphically illustrate an attribute of the underlying item. In one embodiment, a clustering application (not shown) automatically clusters all of the items so that each item is assigned to one of a predetermined number of clusters, e.g., based on document similarity, as described, for example, in co-pending application Ser. No. 12/479,972, filed Jun. 8, 2009, entitled SYSTEM AND METHOD FOR ASSISTED DOCUMENT REVIEW, by Caroline Privault, et al, the disclosure of which is incorporated herein in its entirety by reference. The objects 20, 22, 24 may be colored, one color for each of the clusters, or otherwise graphically differentiated. The presence of certain keywords, an assigned class, or the like in the items may also be an attribute on the basis of which the objects are initially differentiated.

At S106, touch contact on the screen 14 is detected, e.g., contact of a finger or of an implement with a multi-touch area or the whole hand. The contact is associated with the virtual magnet 16 (S108). For example, the approximate number of touch sensitive elements in the area which the finger or inanimate object makes contact is detected and associated with the magnet 16. In another embodiment, the touch-screen includes an array of infrared emitter-collector pairs to project an invisible grid of light on the screen. When the beam is interrupted, e.g., by a finger or other implement, the absence of the signal at the collector is detected and converted to an x,y touch coordinate, which is associated with the magnet.

Figure 3:
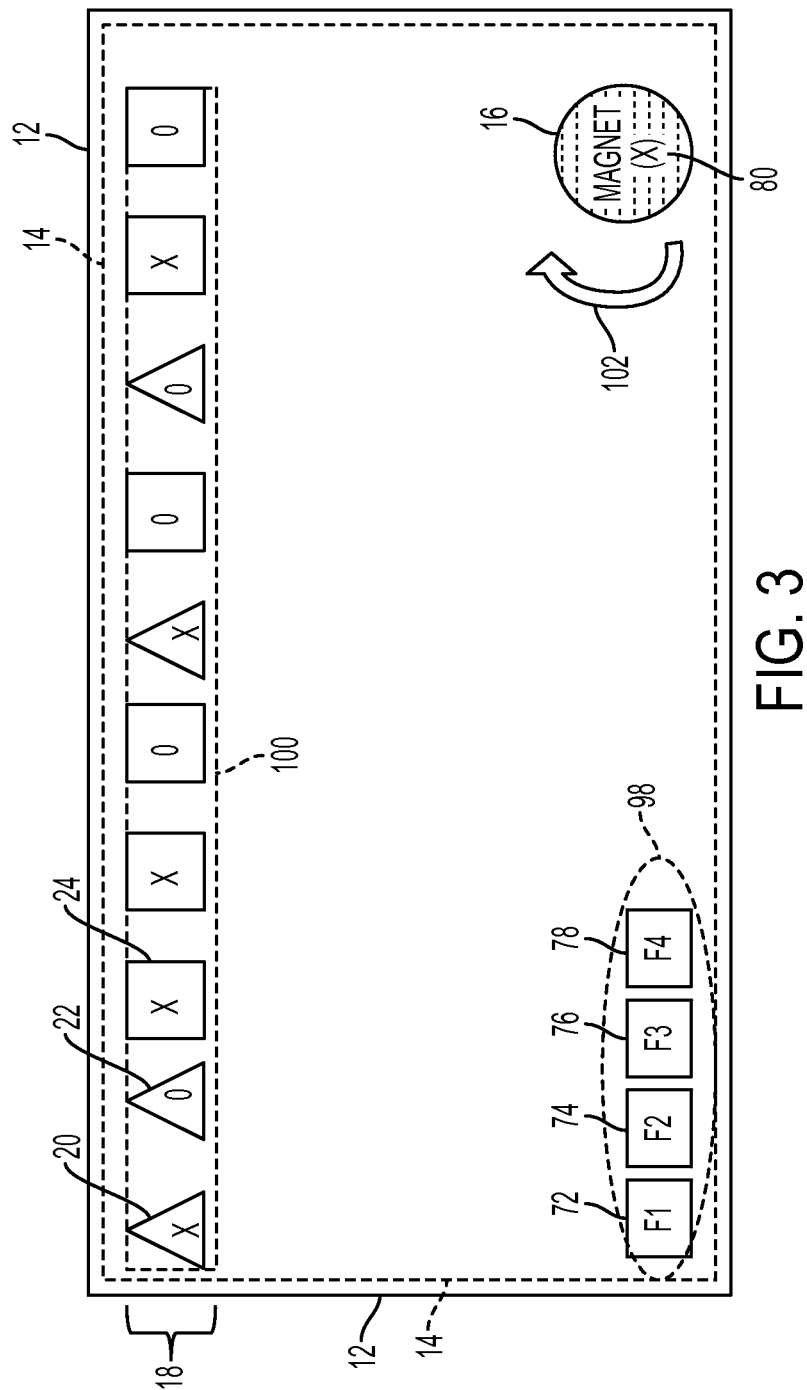
FIG. 3 is a screenshot illustrating graphic objects (squares and triangles) of items, such as documents, and a virtual magnet in its base (inactive) location.

If a plurality of different magnet responses is available, each response may be associated with a respective icon 72, 74, 76, 78 (FIG. 3). Each icon represents a function of an attribute of the items and a command based on whether or not the item satisfies the function.

At S110, finger or tangible object contact with the touch-screen on the respective functional area of one of the displayed icons 72, 74, 76 or 78 is detected and the virtual magnet 16 is associated to a corresponding predefined command to be applied on the set of objects 20, 22, 24, etc. The virtual magnet 16 then becomes active. The active state of the magnet may be illustrated on the screen by a change in color, shape, and/or other graphic attribute of the magnet button 16. If only one command is available, this may be incorporated in the configuration file and thus no selection is needed.

In one embodiment, the virtual magnet 16 may be associated with more than one function selected from the set of available functions (F1, F2, F3, F4, etc.) If a user decides to associate more than one function, at S112, the method returns to S110 for the virtual magnet 16 to be associated with a second command. For example, this may be used to combine two different filtering rules for document retrieval: a document similarity filter plus a keyword search filter.

Figure 4:
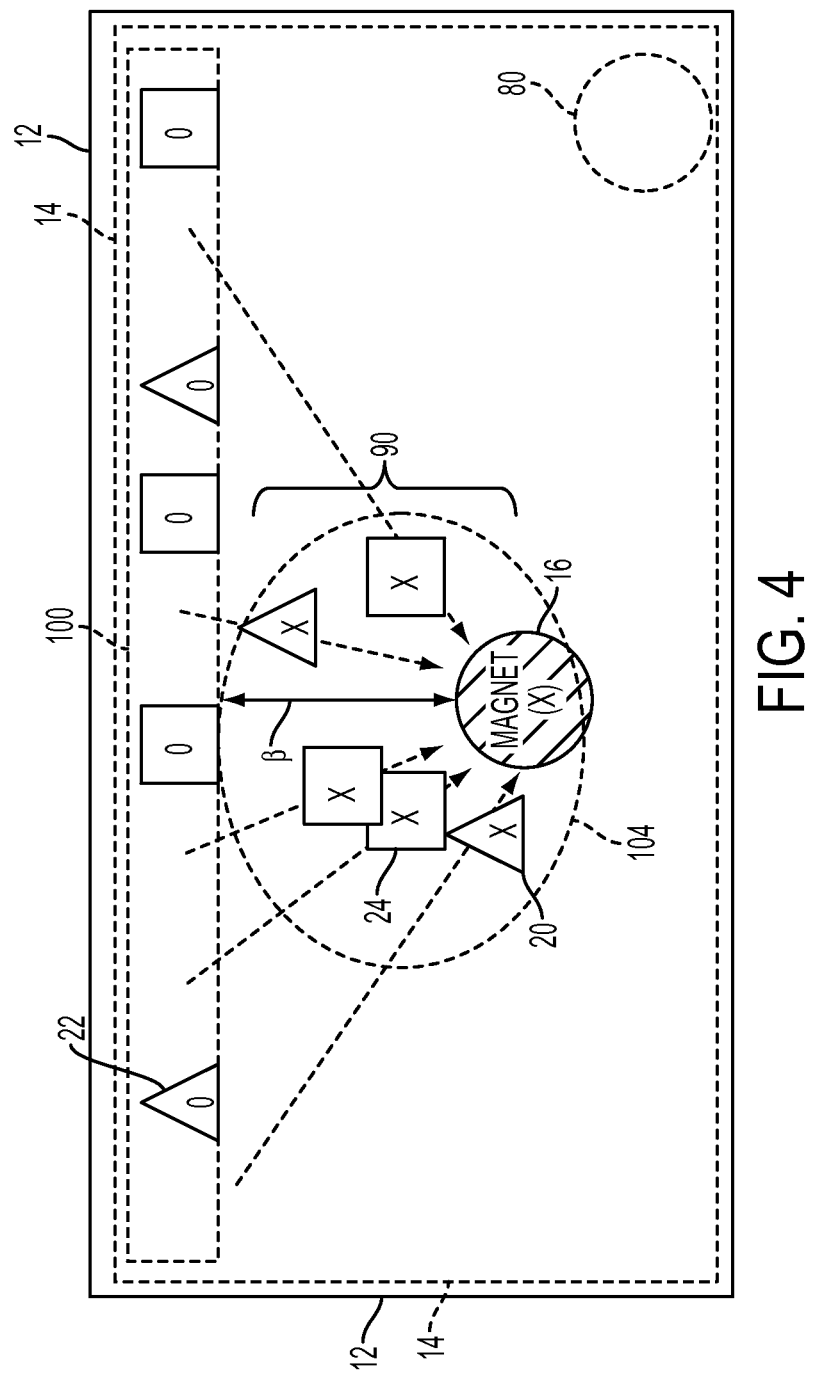
FIG. 4 is a screenshot illustrating movement of a subset of the graphic objects towards the magnet (now active), based on an attribute of the underlying documents.

The user touches the virtual magnet 16 and with a suitable gesture, drags it across the touch-screen away from its home base 80 towards the set 18 of objects 20, 22, 24 (FIG. 4). As the virtual magnet moves closer to the set of documents, its new position is detected (S114). If at S116, the detected magnet distance to the object set is within a threshold distance ($\beta$), this triggers a magnet action (S118). The command associated with the magnet (document retrieval, document filtering, one-class classification, document similarity, etc.) is performed (e.g., by a computation component 82 of the magnet controller 40, FIG. 1) to compute a subset of "selected objects" (i.e., the ones representing items meeting the function request).

At S120, the subset of graphic objects selected through the magnet command function is caused to exhibit a response to the virtual magnet, e.g., move relative to (e.g., closer to) the virtual magnet (FIG. 4). In the illustrated embodiment, the objects 20, 24, etc. move from their initial arrangement to form a new arrangement closer to the magnet while the remaining objects, which do not satisfy the command function, remain in place. Alternatively, or additionally the objects in the subset exhibit a change in a graphic property. This separates the subset of objects from other objects in the set. Where the function associated with the magnet further returns a level of eligibility for each item to be part of the subset, the method may include displaying the respective objects around the virtual magnet at different distances, the distance between the virtual magnet and the objects reflecting the corresponding item's degree of eligibility. For example, the best candidates according to document similarity, are placed closest to the virtual magnet, with other objects, not so highly ranked, being located at further distances. For example, in FIG. 4, object 20 has been located closer to the magnet than some of the other objects, indicating to the viewer that it is more highly ranked, in terms of responsiveness. Where the objects exhibit a change in a graphic property in response to the magnet, the change may similarly be a function of the degree of eligibility in the subset, for example, the color may change in intensity or hue, and the extent of that change may be based on the degree of eligibility.

Figure 5:
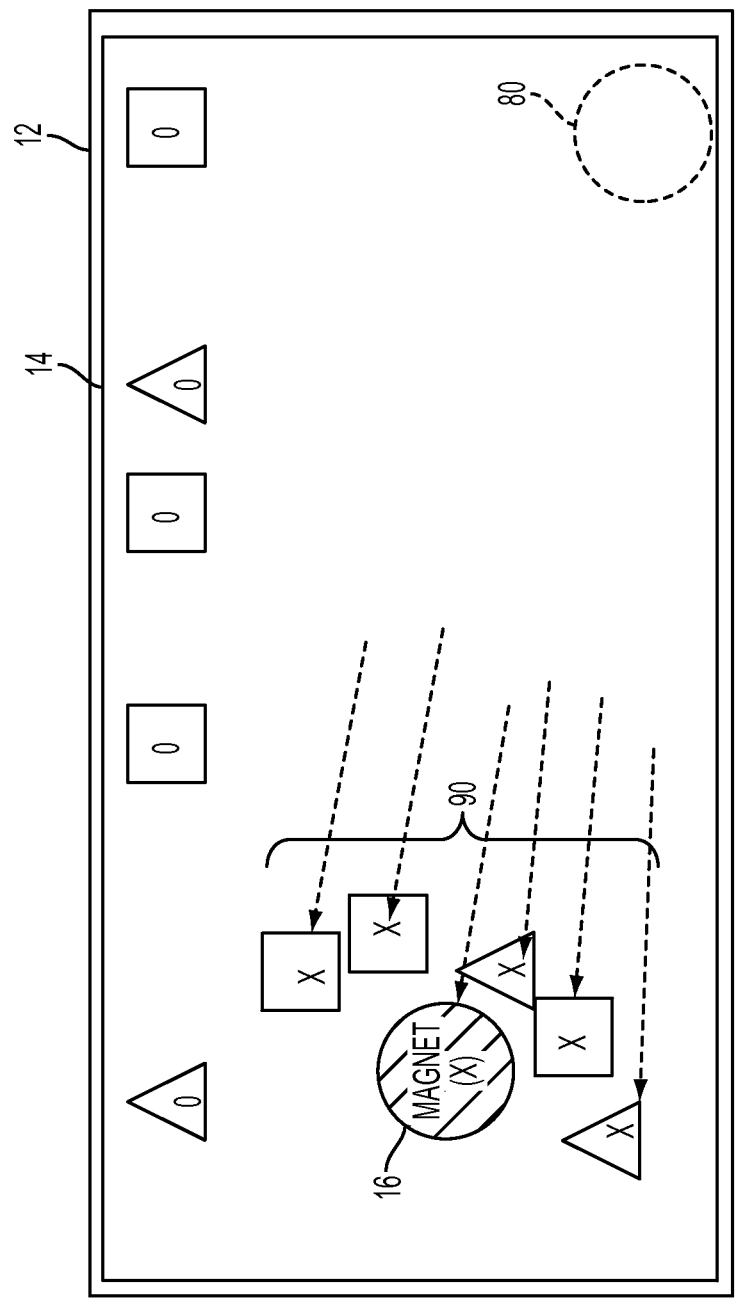
FIG. 5 is a screenshot illustrating graphic objects being drawn to another area of the screen as the virtual magnet is moved across the screen.

The user may further move the virtual magnet 16 around the screen, keeping the subset of selected objects close to the virtual magnet (FIG. 5). This allows the subset of selected objects to be positioned in a separate area of the screen. Optionally, the user may further separate the documents by assigning the magnet a new command function and drawing ones of the objects from a separated group towards (or away from) the magnet.

Figure 6:
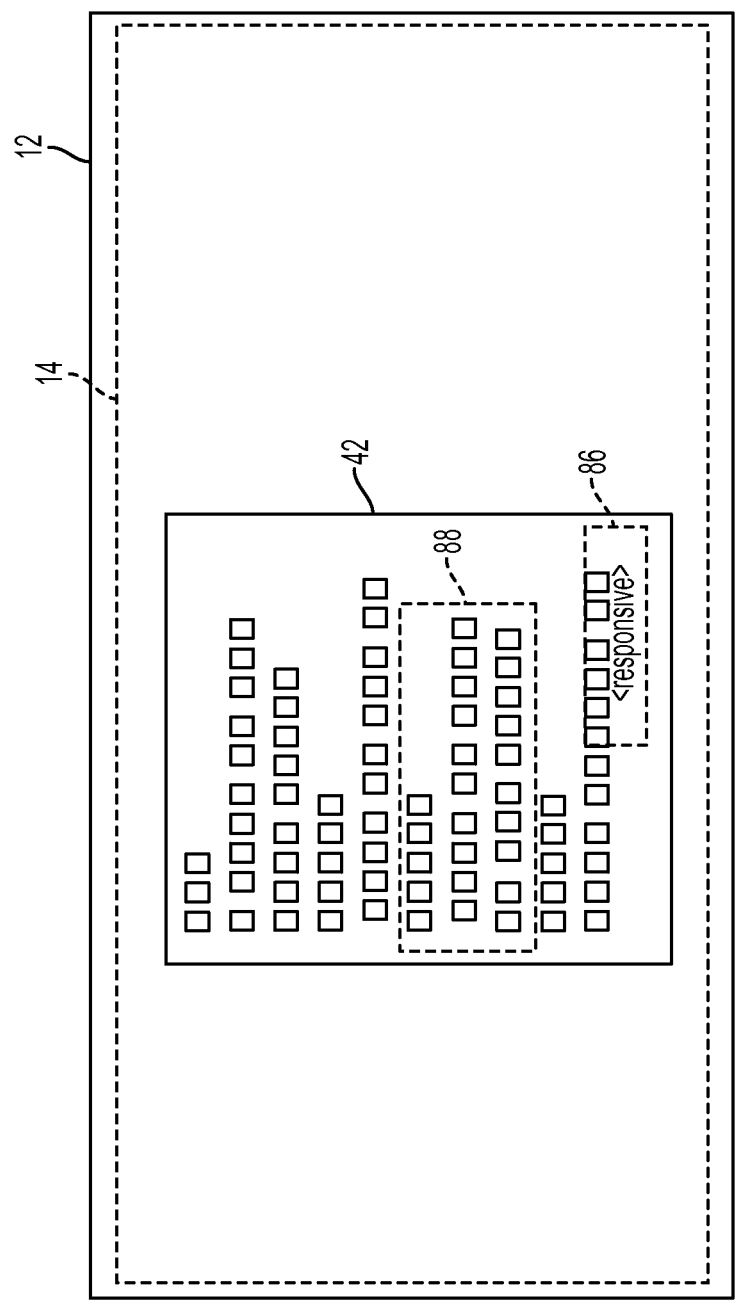
FIG. 6 is a screenshot illustrating a document, corresponding to one of the graphic objects, in the process of review.

At S122, in response to a selection of one of the displayed objects (e.g., a double tap on the respective object 20), the corresponding item, such as a text document 42 may be retrieved (e.g., by a retrieval component 84 of the magnet controller, FIG. 1) and displayed on the screen (FIG. 6). While the user may chose to review ones of the items corresponding to the objects in the subset responding to the magnet 16, in other instances, the user may select to review items corresponding to the remaining objects.

As will be appreciated, the user may decide to view several items and annotate them with tags 86, such as HTML tags, highlight text portions of interest, as shown at 88, manually classify the item, place the item in a particular file, or perform any other appropriate action on the item. One application for the virtual magnet in a classification task is described in above-mentioned co-pending application Ser. No. 12/479, 972, filed Jun. 8, 2009, entitled SYSTEM AND METHOD FOR ASSISTED DOCUMENT REVIEW, by Caroline Privault, et al.

The method ends at S124.

The method illustrated in FIG. 2 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

Further details of the system and method will now be described.

FIG. 3 illustrates a screenshot of the TUI 10 displaying a set of graphic objects 20, 22, 24 representing, for example, a set of documents to be processed. In the illustrated embodiment, the objects are arranged in a line so that each object is visible on the screen, although for large item collections, the objects may be arranged in a pile, with only the uppermost object being visible on the screen 12. Other icon arrangements on the screen are also contemplated, such as lists of documents, icons on lines, clouds, tiles arranged in an array, etc. The virtual magnet 16 is shown in its stationary (home) position 80. The documents are represented by simple graphic objects, here squares and triangles, and the magnet 16 by a distinguishable graphic object, such as a circle (distinguishable from the objects, for example, by one or more of shape, size, color, texture, text, or the like) although other representations are contemplated, such as a three dimensional representation of a magnet or other icon. The different shapes/colors etc. of the objects may be used to convey information about the actual documents 42, 44, 46. For ease of understanding of the method, the objects are shown with a sign (here x or o), which indicates whether they will be drawn to the magnet, based on the attributes of the underlying documents. For example, objects with an x sign are drawn to a magnet with an x sign. In an actual embodiment, these signs are not displayed on the TUI 10. While a single virtual magnet 16 is shown, it is also contemplated that a plurality of virtual magnets may be displayed, each assignable with the same or a different function command.

In the exemplary embodiment, the magnet has an inactive state, in which it does not have an influence on the displayed graphic objects, and an active state, in which only those objects satisfying the function command exhibit a response to the magnet, e.g., are either attracted or repelled (move closer or further away) and/or change in a graphic property. In the embodiment illustrated, the virtual magnet's attractive force is not actuated while the magnet's position exceeds a threshold distance β from the objects, and thus in its default position 80, shown in FIG. 3, does not elicit a response in any of the objects. When the virtual magnet is moved to a position where it is at or below the threshold distance β from any of the objects, the assigned magnet function is actuated and a subset 90 of objects is attracted to or otherwise responds to the virtual magnet, based on the attributes of the underlying document(s) (FIG. 4).

In another embodiment, the magnet assumes an idle (non-magnetic) state when in the default position and is actuated, e.g., by a finger tap, to assume its magnetic state. The tap is recognized by the magnet controller 40 as a signal to actuate the magnet.

To drag the virtual magnet 16 to a selected position, the user may touch the virtual magnet (e.g., with the tip of a finger 66 or other implement), and without lifting the finger from the touch-screen 14, moves the finger to a different location on the touch-screen. The drag is complete when the user lifts the finger from the touch-screen. The magnet 16 stays in the new position and, if within the threshold radius β from the objects, attracts objects, based on their attributes (FIG. 4).

In other embodiments, the dragging operation may be accomplished by a user dragging an implement, such as a solid cylinder 92 (FIG. 7) across the screen. In this embodiment, the magnet button 16 need not be displayed. Rather, an area 94 of the touch-screen 14 that is contacted by a tip 96 of the implement 92 acts as the virtual magnet 16. In other embodiments, area 94 corresponding to the virtual magnet may be displayed, e.g. shown as a colored circle or the like. In general, the implement 92 has a sufficiently large tip to contact a group of actuable areas. One advantage of using an implement rather than a finger is that when using a finger, the user may accidentally bring other areas of the hand into contact with the screen 14, which cause conflicting signals to be sent to the magnet controller 40. A user may grasp the implement 92 at a position which is spaced from the touch-screen 14, such that only the implement tip 96 makes contact with the touch-screen. While the exemplary implement is cylinder shaped with a circular tip, other elongate shapes may be used.

In other embodiments, interaction with the magnet controller 40 may be partly achieved with a keyboard, joystick, voice recognition device, or the like.

The virtual magnet 16 (a single virtual or tangible widget) described herein whose role is to automatically attract documents according to predefined functions or filtering rules reduces the number of repetitive user actions which would otherwise be required to separate, review, and process a large document set. Additionally, the virtual magnet may be used to perform a variety of different actions, which are readily implemented in the interface and easily learned by the user.

Figure 7:
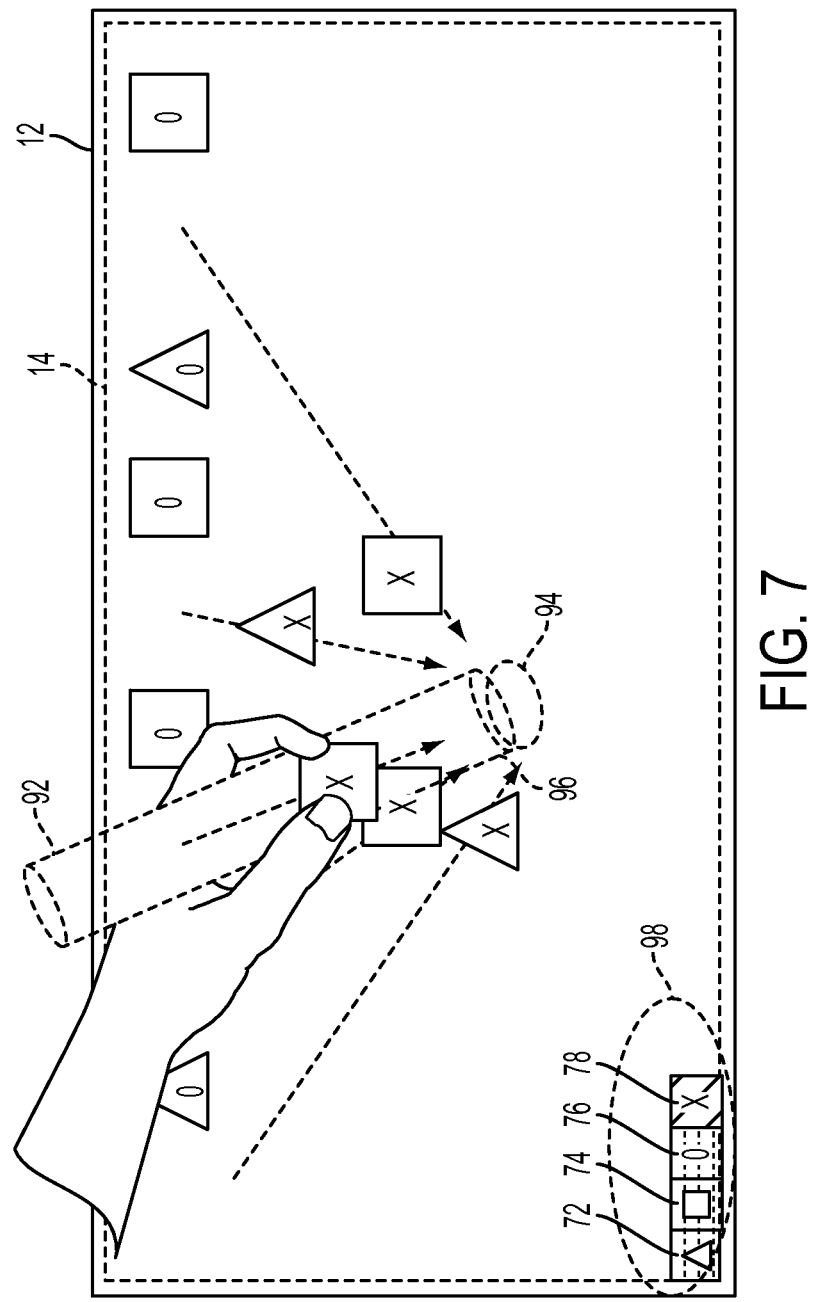
FIG. 7 illustrates another embodiment of a virtual magnet defined by an area of contact between a tip of an implement and the tactile user interface functioning analogously to the finger directed virtual magnet of FIG. 4.

As shown in FIGS. 3 and 7, a predefined zone 98 of the screen 12 displays icons 72, 74, 76, 78 representing different functions. Exemplary functions which may be assigned to these icons can include, one or more of:

1. Positive document filtering: any rule that enables filtering out of a subset of the document collection, for example, through predefined keyword based searching rule, multi-word expression searching, etc.
2. Negative document filtering: any rule that enables filtering out of a subset of documents that do not meet a specific predefined keyword based searching rule, or multi-word expression searching rule, etc.
3. Document similarity: any algorithm capable of identifying a degree of similarity between a predefined sample document and any other document, based on its textual content, visual content or both.
4. Document classification: any automatic classifier implemented through an algorithm which is able to associate a predefined label to a document, based on its textual content, visual content, or both, and to return the documents likely to belong to a specific target class (one-class classification), or to two or more classes (multi-class classification).

A simple keyword search filter may be built with a function such as: if the item contains the word "confidential" and either "attorney" or "privilege," then the function is met and the command requires the graphic object representing the item to exhibit a response (e.g., move towards) the magnet when the magnet is within a predetermined distance.

Through a second touch action of one or more finger contacts with the touch-screen display on the functional zone 98, the magnet button is associated to one of the predefined commands to be applied on the set of documents (S110). Optionally the virtual magnet can be associated with several different actions before moving the magnet to an object zone 100, in order to associate multiple functions to the same magnet button (S112). For example, the user can choose to combine two different filtering rules for document retrieval, a document similarity filter plus a keyword search filter, so as to retrieve documents similar to a document D and that respond to the query "document contains word 'business' and/or word 'model'".

Through natural motion gesture the user moves the magnet button 16 (or tangible object) close to the set of objects displayed in the object zone 100 and the next heuristic is run: after the button has reached a predefined minimal distance β to the object set of zone 100, the function associated with the magnet is applied to compute the subset of selected documents, i.e. the documents meeting the function request (S118). The document icons corresponding to the documents within the selected subset 90 are automatically moved by the system close to the magnet button 16, or otherwise exhibit a response to the magnet, without further user action (S120). As previously noted, a magnet could alternatively have a repelling action on objects depending on the selected function, instead of an attractive action, or in addition to the attractive action, and/or elicit a graphic response.

If the user further moves the virtual magnet 16, for instance moving away from zone 100 or to any location around the screen, the subset 90 of elected documents remains close to the magnet 16 and moves along with the virtual magnet 16 (FIG. 5).

In addition, if the function associated with the magnet 16 further returns a level of eligibility for each document to be part of the subset, (for instance degree of similarity with the sample document implemented through the magnet button), the elected documents are displayed around the magnet button to different distance reflecting their degree of eligibility; for instance best candidates according to document similarity, are placed closest to the magnet button.

Optionally, the predefined minimal distance β to the object set of zone 100 under which the function associated with the magnet is triggered, can be tuned or adjusted by a rotation through user natural gesture on the magnet button 16 (as shown by arrow 102 on FIG. 3). The same or a similar procedure can be used for tuning other thresholds, such as the maximum number of documents that the subset of "elected documents" can contain.

Depending on the time response for processing the documents of zone 100 according to the function(s) selected in zone 98, the elected documents can be taken gradually from zone 100 and moved one after the other around the magnet 16 so that the user can start further processing the retrieved documents, for example, by opening and reading them. Alternatively, the virtual magnet can have a "Save" action, e.g., touching the screen in an area 104 (FIG. 4) or user selectable action on each object, e.g., by a double-finger-click, that will export all the selected documents to a dedicated folder.

Optionally, the virtual magnet 16 can have a predefined maximum number K of documents to be displayed at once around the magnet 16, so that the document retrieval action (S118 to S122) can be performed several times on groups of K documents.

Various initial arrangements of the objects are contemplated. In the embodiment illustrated in FIG. 3, the objects are initially arranged in the object zone 100 in a line at the top of the screen. The virtual magnet (not yet activated) is at a default position 80 in the left-hand bottom corner of the screen. Once moved to the middle of the screen, close to the object line, some of the objects (meeting a threshold value of the function assigned to the magnet) are attracted, as illustrated in FIG. 4.

Figure 8:
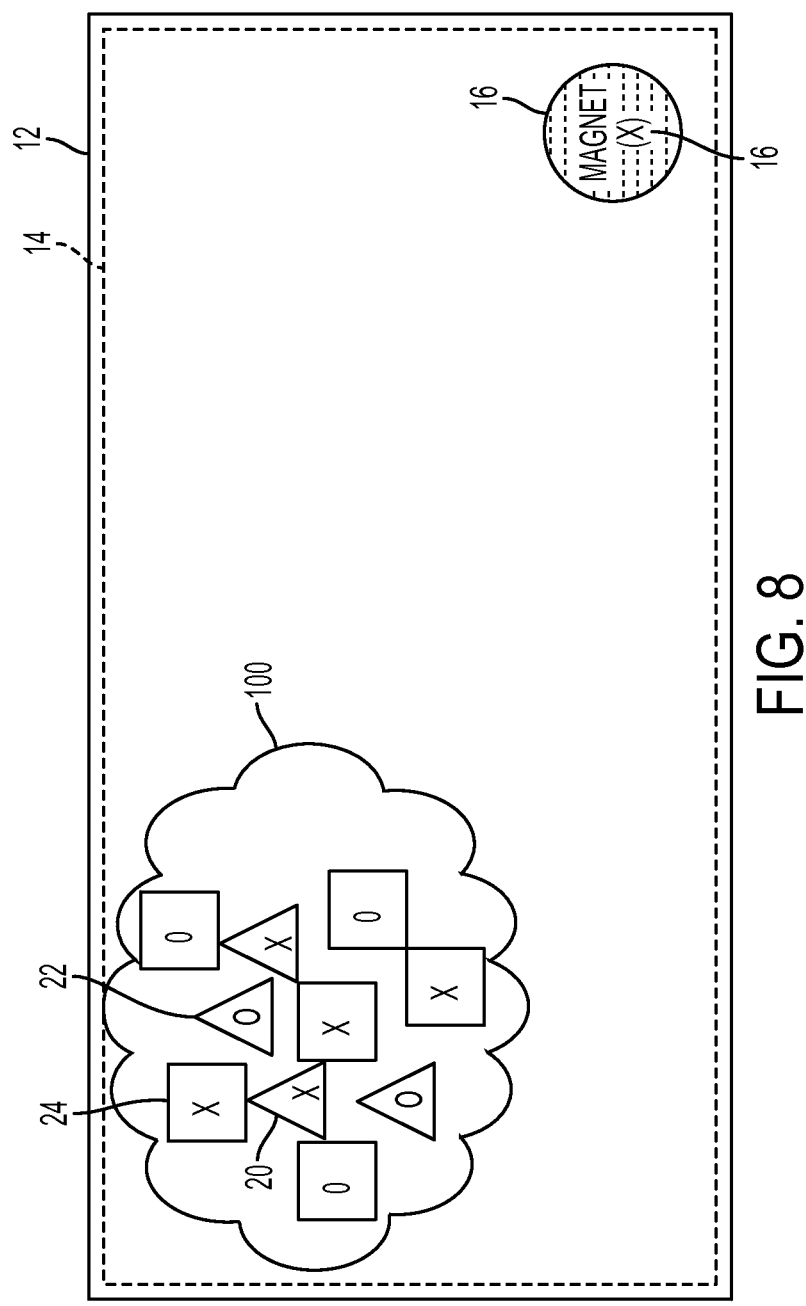
FIG. 8 is a screenshot illustrating graphic objects arranged in a cloud.
Figure 9:
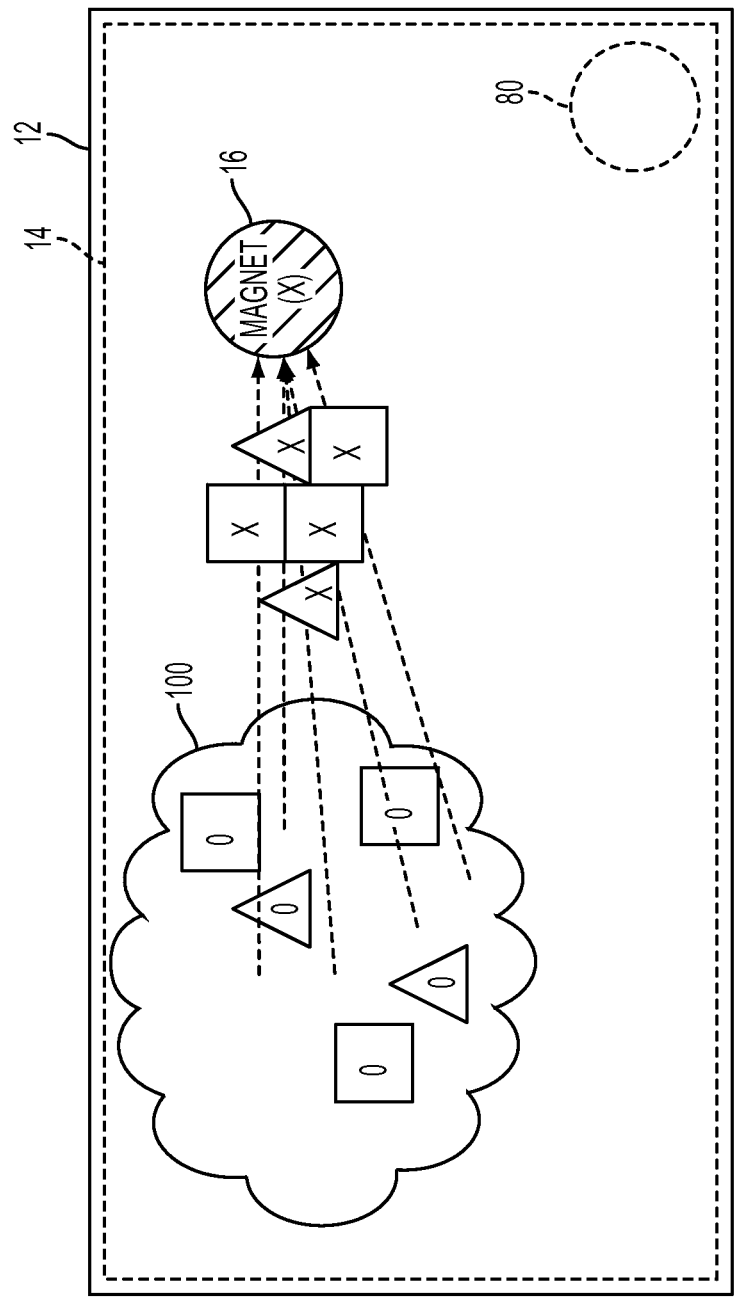
FIG. 9 is a screenshot illustrating a subset of the graphic objects being drawn from the cloud of FIG. 8 towards the virtual magnet, based on attributes of the underlying documents.

In the embodiment illustrated in FIG. 8, objects are displayed in a cloud arrangement 100. The virtual magnet (not yet activated) is at a default place 80 (see FIG. 9) in the right-hand bottom corner of the screen. Once moved close to the document cloud 100, some of the objects get attracted to it, as shown in FIG. 9.

Figure 10:
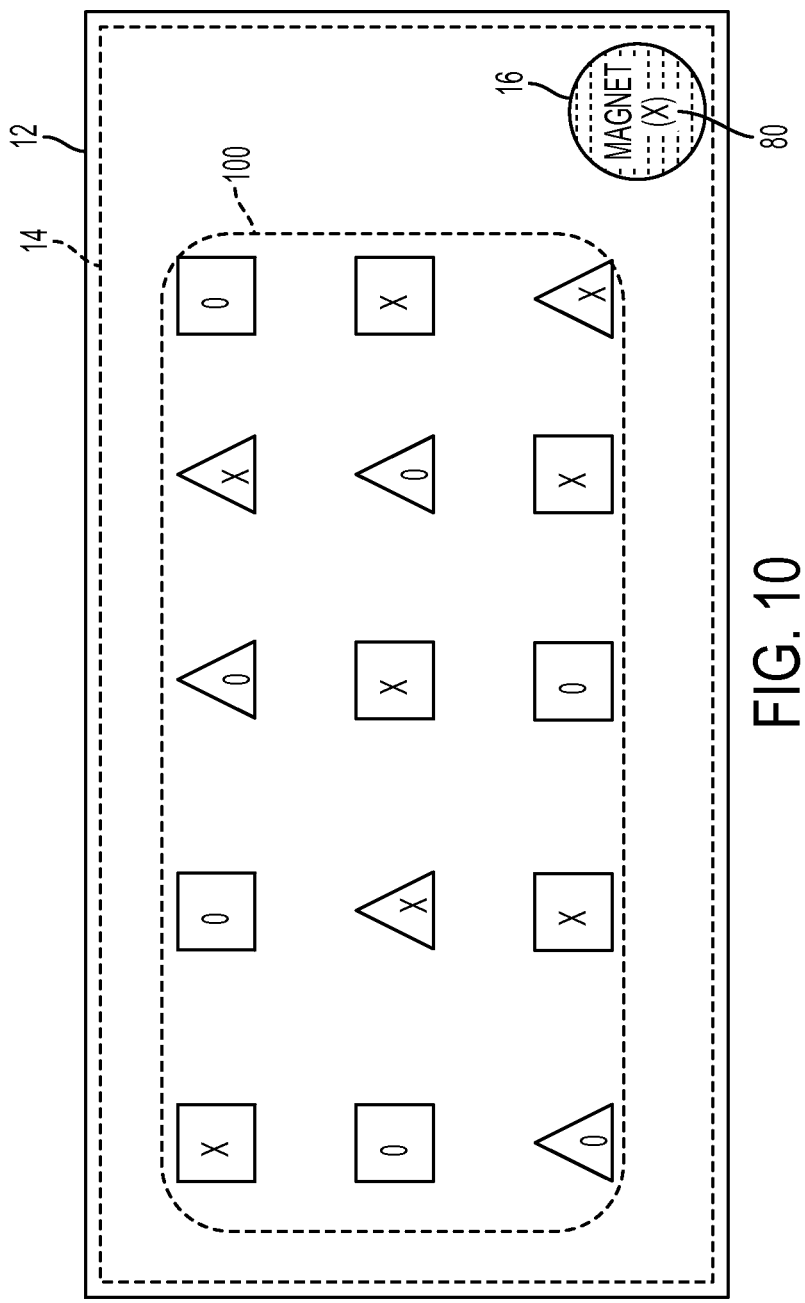
FIG. 10 is a screenshot illustrating another embodiment of an arrangement of graphic objects as an array including rows and columns of graphic objects.
Figure 11:
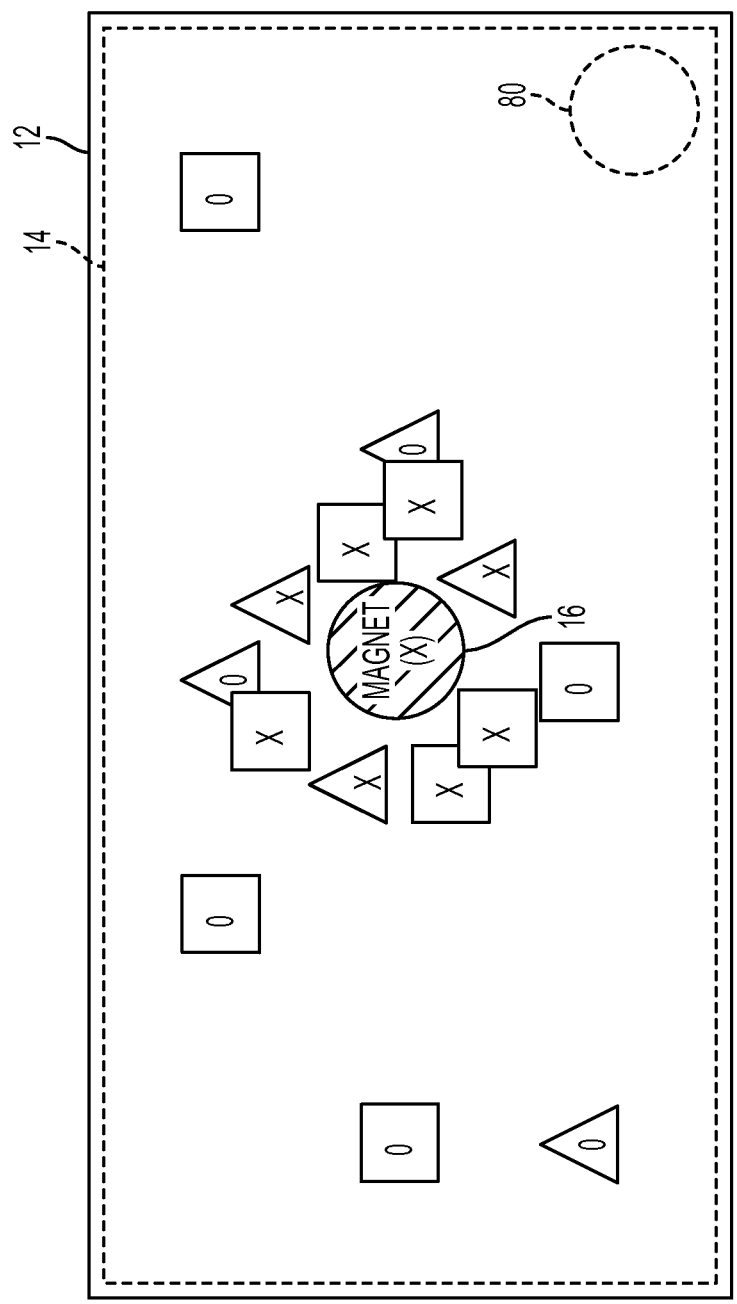
FIG. 11 is a screenshot illustrating the magnet moved to an active position in the center of the array.

In the embodiment illustrated in FIG. 10, objects are displayed in a tile format. As with the other embodiments, when the virtual magnet is moved close to the tiled array, e.g., to its center, only a subset of the objects exhibits a response, by moving toward the magnet (FIG. 11). Note that in this embodiment, some of the non-attracted objects may remain in the vicinity of the magnet. Accordingly, dragging the attracted objects to a separate area of the screen may be used to separate them.

Figure 12:
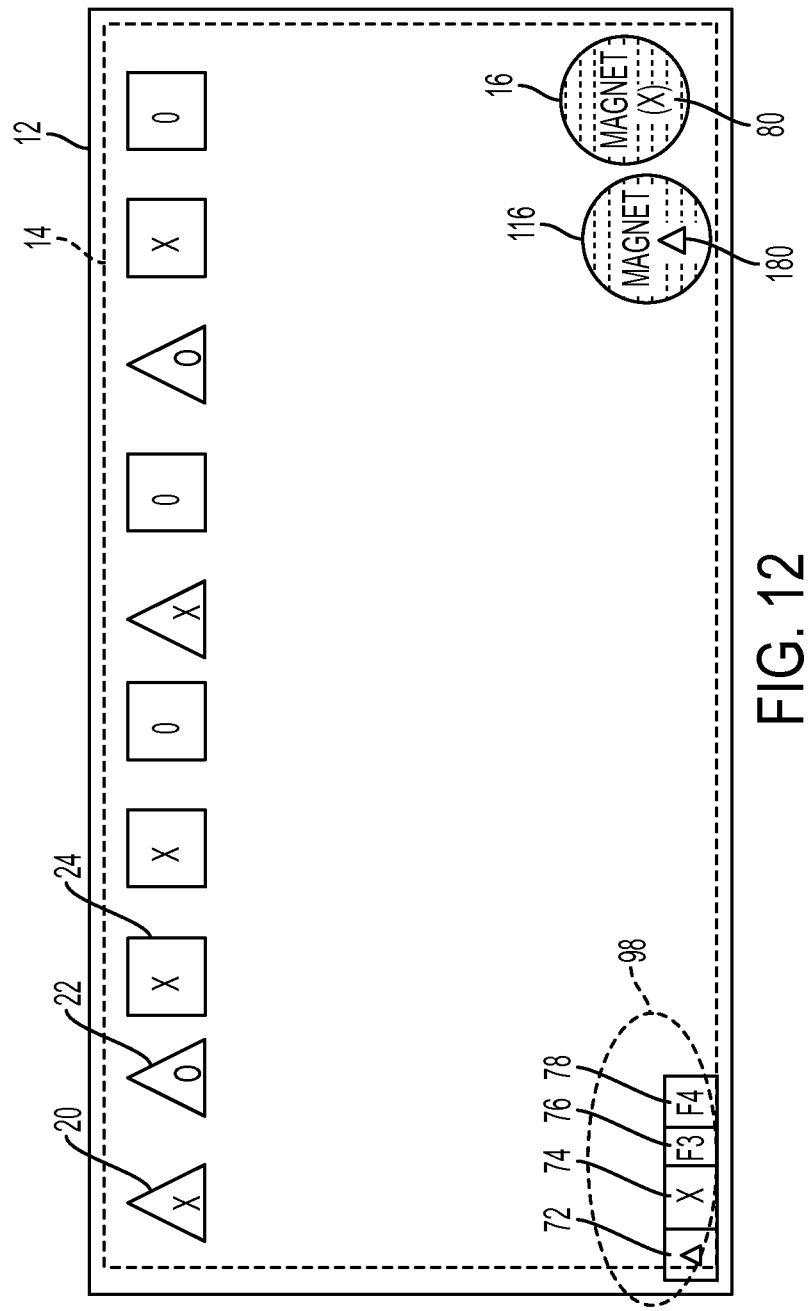
FIG. 12 illustrates an embodiment in which two magnets are associated with different functions.
Figure 13:
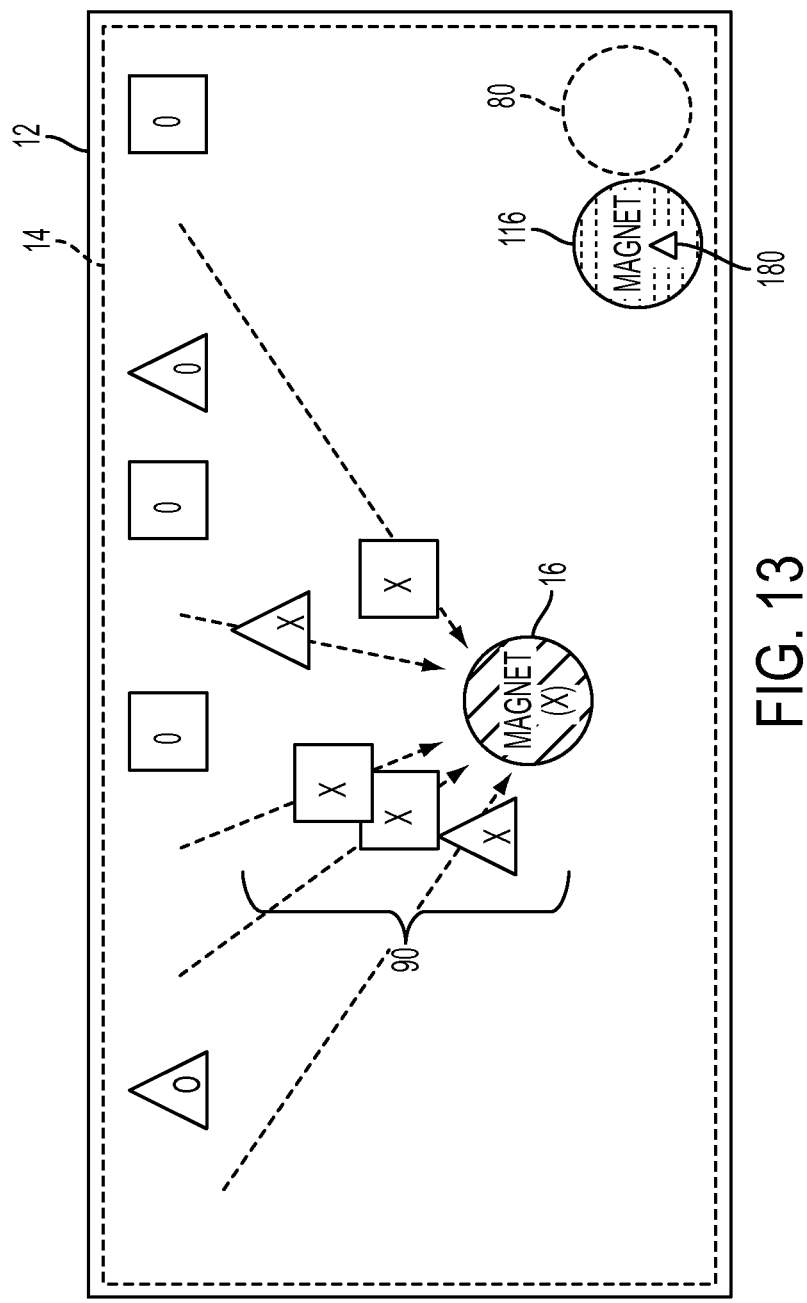
FIG. 13 illustrates a first of the magnets of FIG. 12 drawing a first subset of graphic objects towards it, where the underlying documents satisfy the function associated with the first magnet.

In the embodiment illustrated in FIG. 12, two magnets 16, 116 are displayed in their respective base positions 80, 180 (not yet activated). The user can associate each magnet 16, 116 with a different function. Once moved to the middle of the screen close to the document line, the first magnet 16 associated assigned a function X attracts a first subset 90 (5 objects) of the objects (FIG. 13). The second magnet 116 assigned a function A (triangle) attracts a subset 190 (2 objects) of the first subset 90 of objects (FIG. 14), other objects, such as object 20, 22 are repelled, and may return to their original positions in the line. This provides a combination of the two filtering rules (X and A) in that only objects attracted by both magnets 16, 116 remain around the two stacked magnets 16, 116. In other embodiments, the two magnets 16, 116, may be stacked, one on top of the other, and moved together to the object zone, causing only subset 190, to be attracted.

Figure 15:
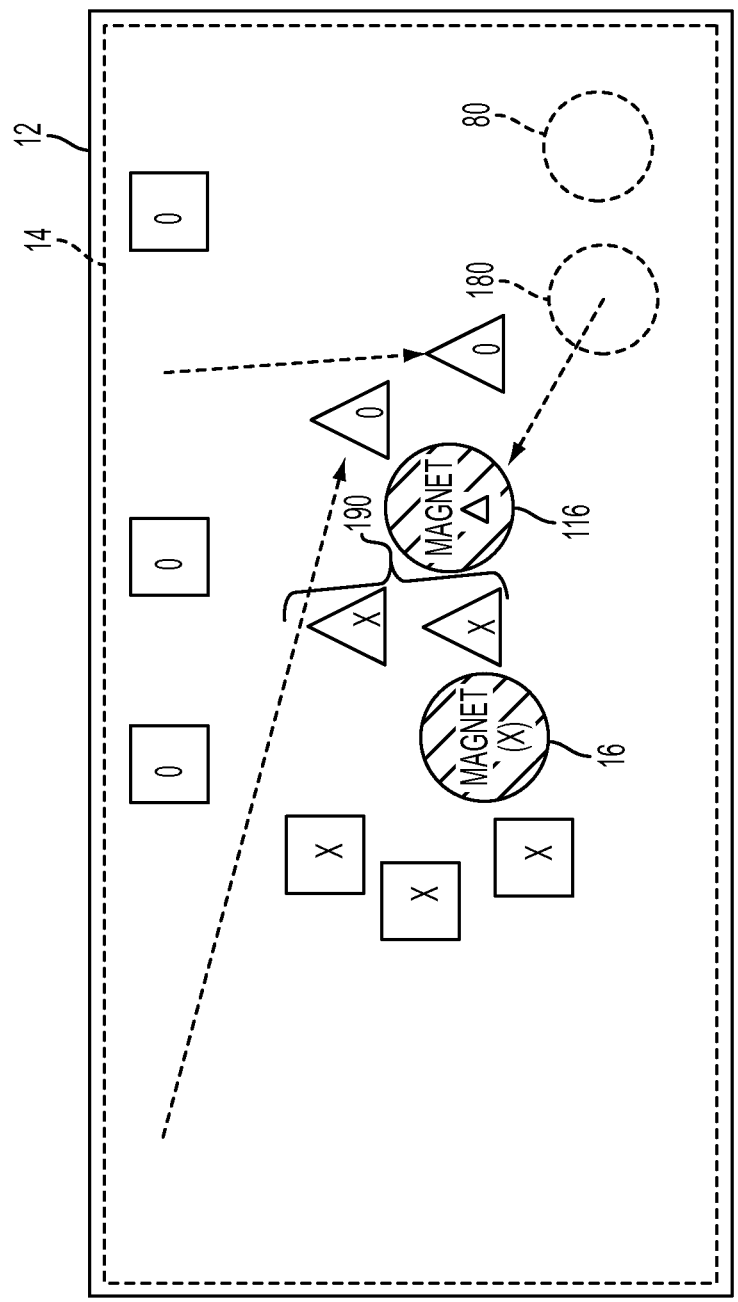
FIG. 15 illustrates an alternative dual magnet embodiment in which the graphic objects are arranged around the respective magnets based on the underlying documents' attributes.

Other combinations of two or more magnets being used conjointly are contemplated. For example instead of being stacked, the two different magnets can be moved close to the document line, and the objects responding to both magnet functions can be placed in the middle between the two magnets, whereas the objects responding to only one of the two magnet functions stay around the corresponding magnet button as illustrated in FIG. 15. The objects satisfying both the X and Δ rules are placed between the X and Δ filtering magnets 16, 116.

Figure 16:
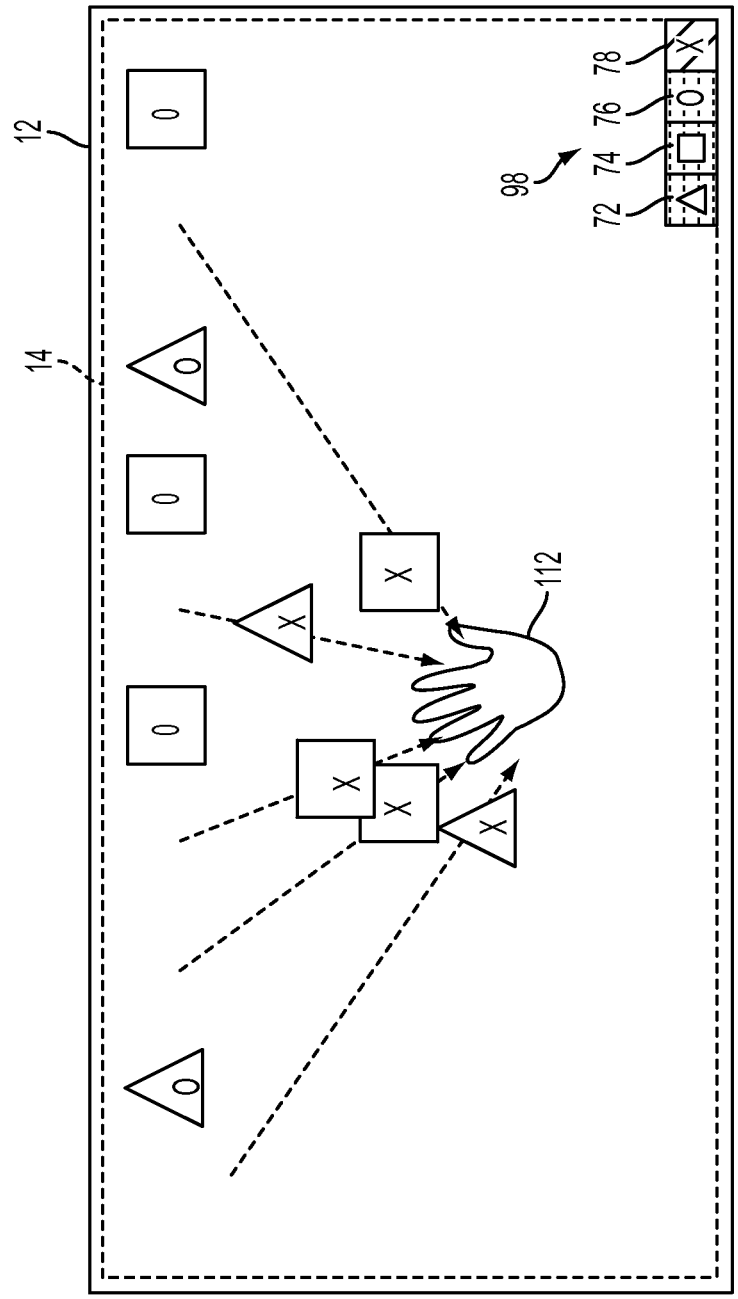
FIG. 16 illustrates an embodiment in which a person's hand serves as an implement analogous to the inanimate implement of FIG. 7.

In the embodiment of FIG. 16, the reviewer's hand 112 is used directly as a magnet. Objects 20, 22, 24, etc. are displayed on a line above the screen. Four function icons 72, 74, 76, 78 are at a default place in the right-hand bottom corner of the screen.

Once a function has been selected to be associated with the "hand magnet" (e.g., by single-finger-click on the X icon), the hand placed on the middle of the screen close to the object line, attracts a subset (here 5) objects, in a similar manner to the displayed virtual magnet 16.

Figure 14:
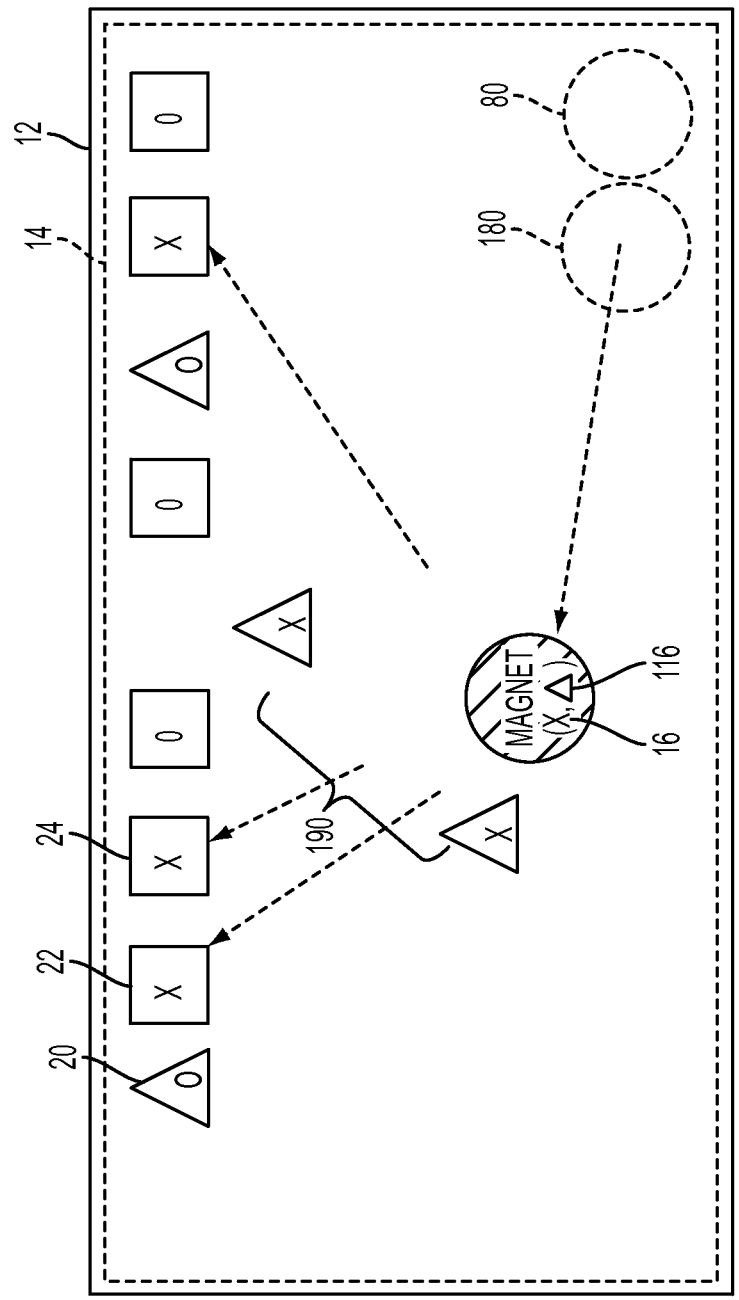
FIG. 14 illustrates a second of the magnets of FIG. 12 drawing a second subset of graphic objects towards it, the second subset being a subset of the first subset, where the underlying documents satisfy the function associated with the second magnet, and illustrating documents being repelled which satisfy the first function but not the second function.

After a second function has been selected to be associated with the "hand magnet" (e.g., by single-finger-click on the triangle icon), the hand placed on the middle of the screen close to the document line, attracts a smaller subset (e.g., 2 objects) because of the combination of the two filtering rules in a similar manner to that shown in FIG. 14.

Alternatively, the several functions can be selected all at once when setting up the "hand magnet" before applying the hand to the document set.

Figure 17:
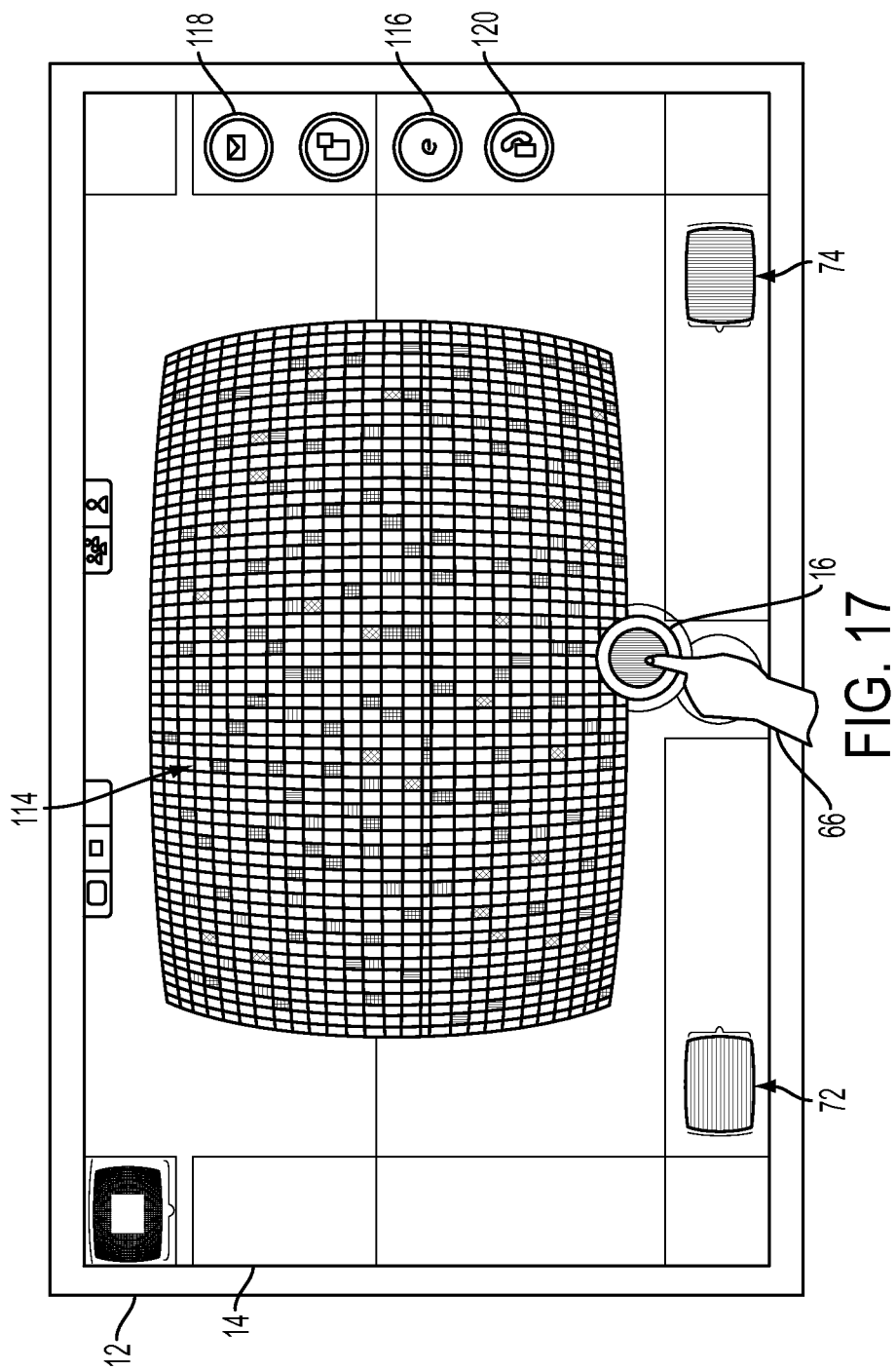
FIG. 17 illustrates an embodiment in which graphic objects are arranged as tiles of a wall and change color in response to the approach of the virtual magnet, based on the attributes of the underlying documents (where different colors are illustrated by differences in shading)
Figure 18:
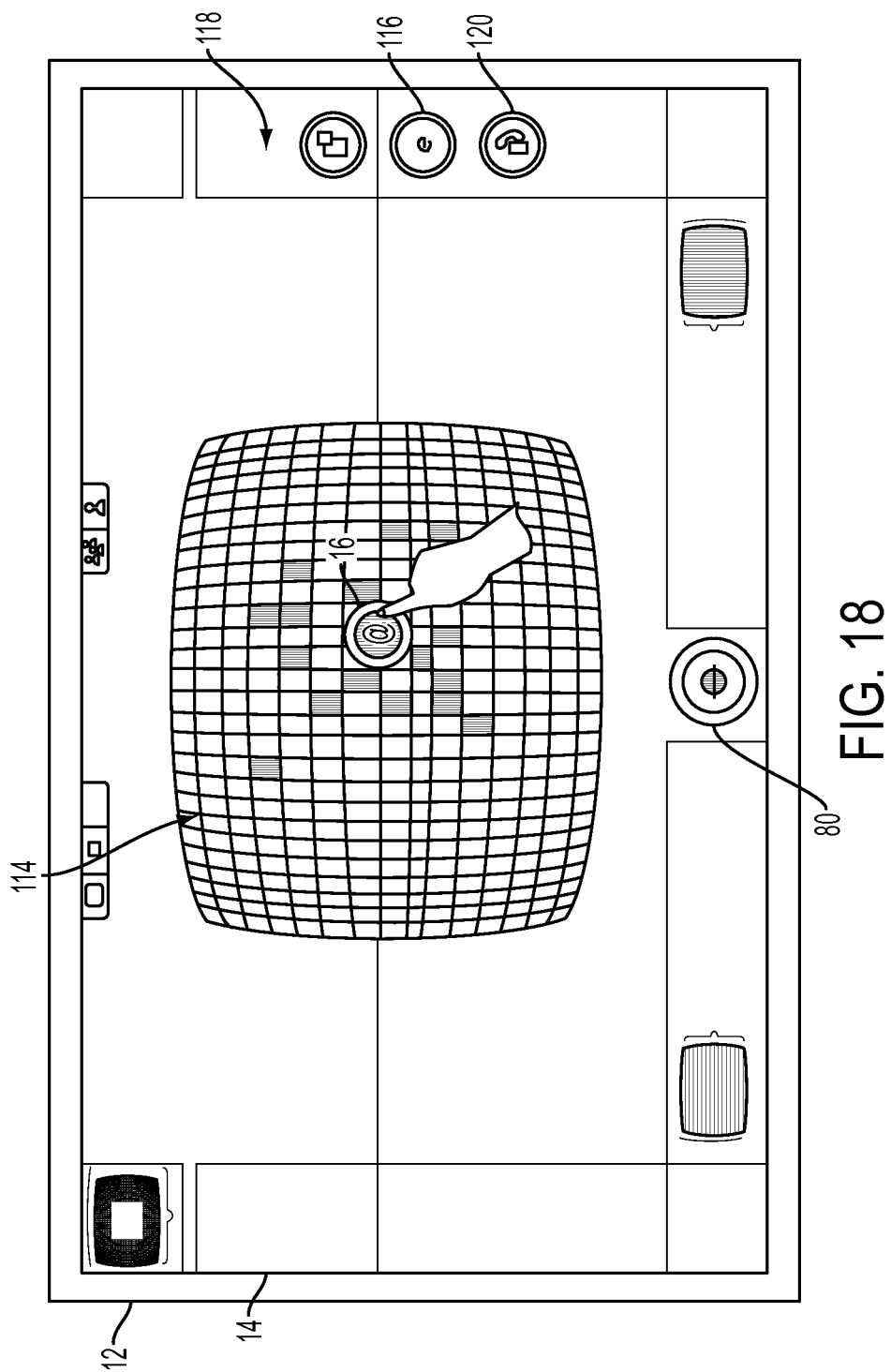
FIG. 18 illustrates responsive graphic objects being drawn to the virtual magnet in the embodiment of FIG. 17.

FIG. 17 shows another embodiment in which the objects are arranged in a wall 114. This arrangement is suited to handling a large document collection. The wall may be a three dimensional wall (a segment of a globe), which can be rotated, by touching a touch responsive icon 116 for viewing a different portion of the wall, with different objects. In this embodiment, the reviewer has a choice of two function buttons 72, 74, which may correspond to responsive and non responsive documents, respectively. When the user chooses one of the functions, by touching the appropriate function button, the magnet is colored with the same color assigned to the function button. The magnet is then moved off its base (inactive) position to a position within the wall. Objects whose corresponding document meets the function (e.g., responsive documents) are shown in the same color as the magnet and are drawn to the magnet, as shown in FIG. 18.

Other objects move to the far side of the wall. Touch responsive icons 118, 120, etc. arranged on the side of the screen allow the reviewer to perform certain tasks, such as opening a document, sending it to trash, confirming the class assigned to the document (e.g., whether it is truly responsive), applying other filtering functions, and so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A tactile user interface comprising:
   a display comprising a touch-screen;
   instructions stored in memory for:
      displaying a set of graphic objects on the display, each graphic object representing a respective item, the items comprising text documents,
      causing a virtual magnet to move on the display, in response to touching on the touch-screen, and
      causing a subset of the graphic objects to exhibit a response to the virtual magnet, each graphic object in the subset responding as a function of an attribute of the item represented by the graphic object, the attribute being based on the frequency of a keyword found in the document; and
   a processor in communication with the memory and display for executing the instructions.

2. The tactile user interface of claim 1, wherein the subset of the graphic objects is caused to respond to the virtual magnet after the virtual magnet is moved from a first location to a second location, closer to the set of displayed objects than the first location.

3. The tactile user interface of claim 2, wherein each of the objects in the subset moves in relation to the magnet based on a degree to which the function is satisfied by the respective item.

4. The method of claim 1 wherein the graphic objects which exhibit a response move relative to the virtual magnet.

5. The tactile user interface of claim 1, wherein the virtual magnet is displayed on the display.

6. The tactile user interface of claim 5, wherein the virtual magnet comprises a plurality of virtual magnets which are displayed on the display.

7. The tactile user interface of claim 6, wherein each of the virtual magnets is assignable with a different function.

8. The tactile user interface of claim 1, wherein the virtual magnet moves across the display in response to a touch which is dragged across the touch-screen.

9. The tactile user interface of claim 1, wherein the response of the subset of the graphic objects with respect to the magnet as a function of an attribute of each of the items represented by the graphic objects in the subset includes the objects in the subset moving closer to the virtual magnet.

10. The tactile user interface of claim 1, wherein the virtual magnet moves position on the display in response to touching on the touch-screen with at least one of a finger and an implement.

11. The tactile user interface of claim 1, wherein the instructions further comprise instructions for displaying a selected one of the set of items in response to a selective touching of the touch-screen.

12. The tactile user interface of claim 1, wherein prior to moving the magnet closer to the set of objects, the set of objects is arranged in an arrangement selected from a line, an array, a cloud and a pile.

13. A tactile user interface comprising:
a display comprising a touch-screen;
instructions stored in memory for:
  displaying a set of graphic objects on the display, each graphic object representing a respective item,
  causing a virtual magnet to move on the display, in response to touching on the touch-screen, and
  displaying a plurality of icons on the display, each of the icons being associated with a respective function for selectively associating the function with the virtual magnet through touch;
  causing a subset of the graphic objects to exhibit a response to the virtual magnet, each graphic object in the subset responding as a function of an attribute of the item represented by the graphic object, whereby when a first of the functions is associated with the magnet, the subset of graphic objects represent items which satisfy the first function and when a second of the functions is associated with the magnet, the subset of graphic objects represent items which satisfy the second function; and
a processor in communication with the memory and display for executing the instructions.

14. The tactile user interface of claim 13, wherein when first and second of functions are associated with the virtual magnet, the subset of graphic objects represent items which satisfy the first function and second function.

15. The tactile user interface of claim 13, wherein the function is selected from the group consisting of:
  positive item filtering for filtering out a subset of the items in the collection which satisfy a predefined filtering rule;
  negative item filtering for filtering out a subset of the items in the collection which do not satisfy a predefined filtering rule;
  item similarity filtering for filtering items which meet a threshold similarity with a predefined item;
  item classification filtering for filtering items assigned a selected class label from a plurality of class labels; and
  combinations thereof.

16. The tactile user interface of claim 13, wherein the attribute is selected from the group consisting of:
  a presence or an absence of at least one keyword in the item;
  a class assigned to the item;
  a degree of similarity between the item and a predefined item; and
  combinations thereof.

17. A manipulation method comprising:
  displaying a set of graphic objects on a display of a touch-screen device, each graphic object representing an item;
  providing a virtual magnet which is movable on the display, in response to touching on the touch-screen;
  displaying a plurality of function icons on the display, each of the icons being associated with a respective function;
  providing for associating a selected at least one of the functions with the virtual magnet through a user's finger contact with the function icon; and
  when the magnet is moved to a location closer to the set of displayed graphic objects, causing a subset of the graphic objects to exhibit a response to the magnet as a function of an attribute of each of the items represented by the graphic objects in the subset, whereby when a first of the functions is associated with the virtual magnet, the subset of graphic objects represent items which satisfy the first function and when a second of the functions is associated with the magnet, the subset of graphic objects represent items which satisfy the second function.

18. The method of claim 17, further comprising:
associating a selected one of a plurality of functions with the virtual magnet by selective touching an area of the touch-screen.

19. The method of claim 17, further comprising:
providing for the objects in the subset to be distanced from the virtual magnet based on a degree to which the corresponding item satisfies the function.

20. The method of claim 17, further comprising:
providing for the objects in the subset to move along with the virtual magnet as the virtual magnet is dragged across the display in response to a touching motion.

21. The method of claim 17, further comprising:
providing for displaying of an item on the display which corresponds to one of the objects in the subset.

22. The method of claim 17, further comprising storing the items in memory accessible to the processor.

23. A non-transitory computer program product which stores instructions which, when executed by a computer, perform the method of claim 17.

24. A tactile user interface comprising:
a display with a touch-screen;
memory which stores a set of items comprising at least one of text documents and images;
instructions stored in memory for:
  displaying a set of graphic objects on the display, each graphic object representing a respective one of the stored items,
  displaying a virtual magnet on the display which is visually distinguishable from the graphic objects,
  associating the virtual magnet with a function which draws graphic objects towards the virtual magnet on the screen based on an attribute of the respective stored item, the function being based on a degree of similarity between a predefined sample text document or image and the stored item, based on its textual or visual content, and
  after the virtual magnet is actuated by touching of the touch-screen, causing a subset of the graphic objects to move toward the magnet, whereby the subset is separated from a remainder of the set of graphic objects, and
  displaying an item corresponding to a user-selected one of the displayed graphic objects; and
a computer processor in communication with the memory for executing the instructions.

* * * * *